United States Patent
Ayachitula et al.

(10) Patent No.: US 8,302,087 B2
(45) Date of Patent: Oct. 30, 2012

(54) QUALITY ASSURANCE IN SOFTWARE SYSTEMS THROUGH AUTONOMIC RELIABILITY, AVAILABILITY AND SERVICEABILITY CODE GENERATION

(75) Inventors: Naga Arun Kumar Ayachitula, Elmsford, NY (US); Andrew J. Bradfield, Cortlandt Manor, NY (US); Shu-Ping Chang, Shrub Oak, NY (US); James S. Lipscomb, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 1150 days.

(21) Appl. No.: 11/620,102

(22) Filed: Jan. 5, 2007

(65) Prior Publication Data

US 2008/0168432 A1    Jul. 10, 2008

(51) Int. Cl.
*G06F 9/45* (2006.01)
(52) U.S. Cl. .......... 717/158; 717/141; 717/170
(58) Field of Classification Search .......... 717/106–109, 717/120–123, 141–144, 158, 170
See application file for complete search history.

(56) References Cited

U.S. PATENT DOCUMENTS

| | | | | |
|---|---|---|---|---|
| 5,649,200 A | * | 7/1997 | Leblang et al. | 717/122 |
| 5,671,415 A | * | 9/1997 | Hossain | 717/101 |
| 5,909,580 A | * | 6/1999 | Crelier et al. | 717/141 |
| 5,950,009 A | * | 9/1999 | Bortnikov et al. | 717/158 |
| 6,748,584 B1 | * | 6/2004 | Witchel et al. | 717/136 |
| 2002/0170032 A1 | * | 11/2002 | Beaven et al. | 717/104 |
| 2005/0015675 A1 | * | 1/2005 | Kolawa et al. | 714/38 |
| 2007/0011654 A1 | * | 1/2007 | Opperman | 717/122 |
| 2007/0061782 A1 | * | 3/2007 | Schreiner et al. | 717/124 |

OTHER PUBLICATIONS

Remillard, J.; , "Source code review systems," Software, IEEE , vol. 22, No. 1, pp. 74-77, Jan.-Feb. 2005 doi: 10.1109/MS.2005.20; URL: http://ieeexplore.ieee.org/stamp/stamp.jsp?tp=&arnumber=1377127&isnumber=30054.*

Hung et al., UNIX Code Management and Distribution; Stanford Linear Accelerator Center; Sep. 1992; pp. 1-4.*

Mitchell et al.; IBM Power Platform Reliability, Availability, and Serviceability (RAS); IBM, 2009, pp. 1-68.*

* cited by examiner

*Primary Examiner* — Wei Zhen
*Assistant Examiner* — Satish Rampuria
(74) *Attorney, Agent, or Firm* — Tutunjian & Bitetto, P.C.; Louis J. Percello

(57) ABSTRACT

A system and method for automatic code generation includes parsing source code in a source program to automatically generate reliability, accessibility and serviceability (RAS) code in response to the source code. The automatically generated code is executed in a check in stage. All, a portion or none of the automatically generated code is selectively removed during a check out stage to keep the source program clean and focused.

20 Claims, 2 Drawing Sheets

QUALITY ASSURANCE IN SOFTWARE SYSTEMS THROUGH AUTONOMIC RELIABILITY, AVAILABILITY AND SERVICEABILITY CODE GENERATION

BACKGROUND

1. Technical Field

The present invention relates to automatic code generation, and more particularly to an autonomic mechanism provided to automate reliability, availability and serviceability (RAS) code generation and removal to improve quality assurance.

2. Description of the Related Art

With software systems becoming more complex and the globalization of a development force, existing software development disciplines need even more serious enforcement to ensure proper operation across distributed networks and different operating platforms. For example, Reliability, Availability and Serviceability (RAS) functional source code inside a software program needs to be enforced more strictly to ensure consistency. However, as with the documentation for software systems, developers are typically not interested in writing RAS source code due to its tedious and repetitive nature. Further, adding additional code segments, e.g., inserting comments inside the source code, sometimes complicates the algorithm or generates a misleading trace when the algorithm itself is modified, but the RAS code or comment does not reflect the program changes.

Therefore, a need exists for consistent generation of RAS code for software programs.

SUMMARY

A system and method for automatic code generation includes parsing source code in a source program to automatically generate reliability, accessibility and serviceability (RAS) code in response to the source code. The automatically generated code is executed in a check in stage. All, a portion or none of the automatically generated code is selectively removed during a check out stage to keep the source program clean and focused.

A method for automatic code generation includes parsing source code in a source program to automatically generate reliability, accessibility and serviceability (RAS) code in response to the source code, executing the automatically generated code in a check in stage and selectively removing all, a portion or none of the automatically generated code during a check out stage to keep the source program clean and focused.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
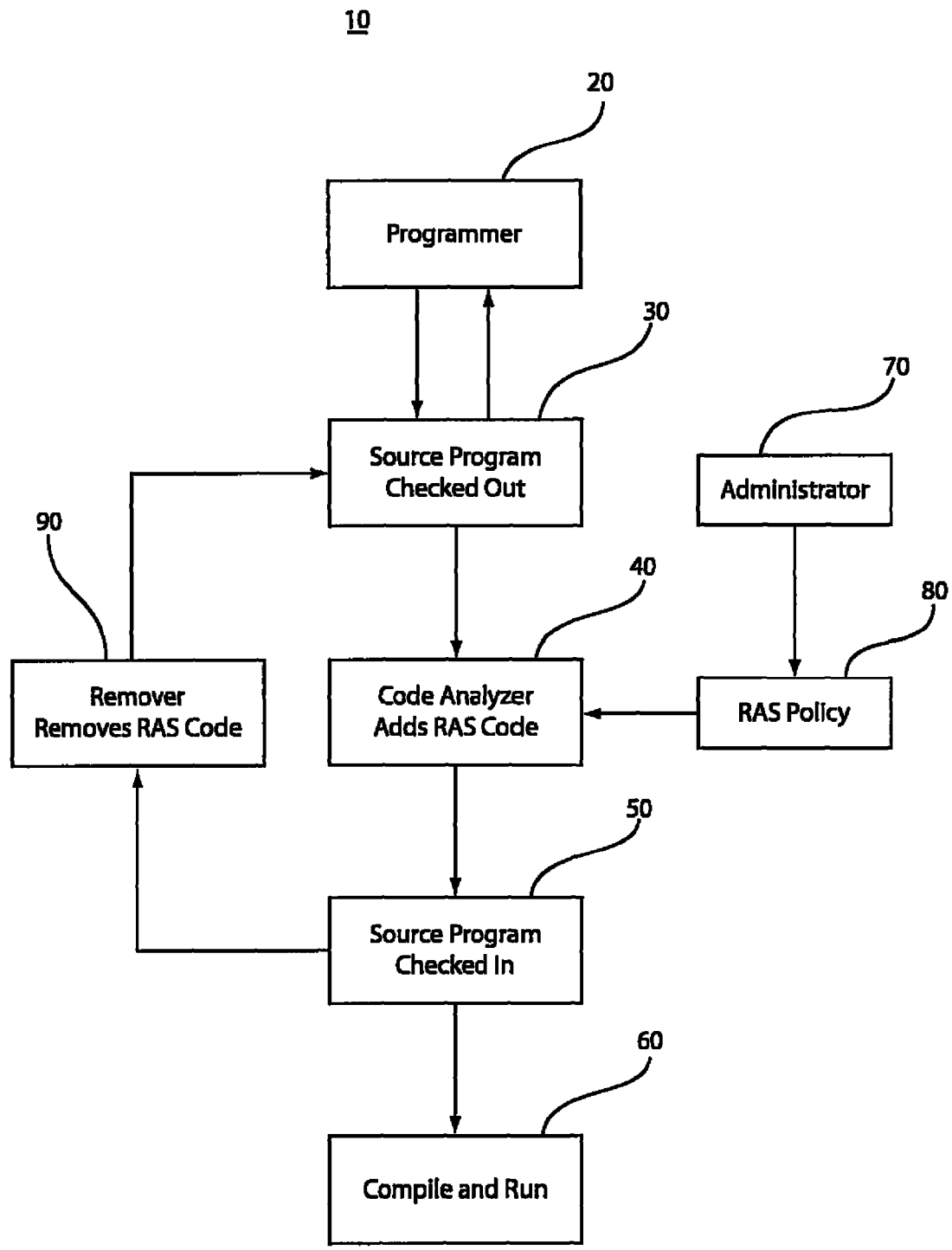
FIG. 1 is a block/flow diagram showing a system and process flow for automatically generating RAS program code in accordance with the present principles.

In accordance with present embodiments, an autonomic mechanism is provided to automate Reliability, Availability and Serviceability (RAS) code generation and removal. The RAS code may be executed automatically within a software Integrated Development Environment (IDE) or other suitable environment, e.g., when a developer has to "check-in" the code file. The mechanism similarly removes the code files automatically during "check out" to keep the main algorithm clean and focused. Clean and focused refers to the state of the program as being in compliance with applicable standards and policies with a minimized amount of code. The mechanism may also run independently against specific program modules and/or program component source code files to generate an intended result. This ensures RAS code is generated consistently corresponding to the code, with high quality assurance and complies with enterprise product policies. The RAS task is thereby removed from the developer load so that he/she may focus on other deliverables or activities.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a block/flow diagram is shown depicting a system 10 and process flow for generating and removing Reliability, Availability and Serviceability (RAS) code in accordance with the present principles. The system may be integrated in an IDE, version control system or used as an independent utility.

In one embodiment, a programmer 20 writes a source program 30. When the writing is complete, the programmer 20 "checks in" the code through a code analyzer 40. The code analyzer 40 first parses the program like a compiler according to a RAS policy 80 that was defined by an administrator 70. How and when to generate the RAS code may be controlled by company policy or other authority to reach the desired software quality assurance (QA) target. Policies may include ways of formatting an output, comments or designations to be added to code, ways of setting up input/output data, or any other standardization or policy that a system needs to follow. The RAS policy 80 may generate code by identifying particular code statements, sequences of code statements, call input from a programmer or any other acceptable trigger mechanism designed to alert the code analyzer 40 to generate/add RAS code to the source program 30.

Examples of a policy from an organization or project interested only in tracing code execution may include, e.g.: policies to RAS enable tracing of procedure calls at trace levels above, e.g., 10, policies to not RAS enable tracing of entering and leaving blocks within a method, and policies to not RAS enable database rollback. Of course, policies may take many other forms and may be enforced under varying conditions.

Advantageously, the code analyzer 40 automatically generates and inserts RAS code(s) into the original source 30 code to comply with the RAS policy 80. The RAS policy 80 may dictate the type or method of RAS code generation. The policy 80 may also dictate standards or policies on how the source code should be presented or written, the placement of the RAS codes and the removal of some or all the RAS codes upon check out. A multitude of applications may benefit from the present teachings, therefore, the situations where the RAS code is automatically generated may be many within the scope of the present claims.

In one example, RAS code may be generated automatically in an IDE such as Eclipse™. Source code is checked out of a source code repository in block 30 so that a developer may edit the contents. A wizard may be launched requesting input from the developer as to what RAS policy should be enforced as well as any RAS related formatting that is desired. On completion of the wizard, the RAS logic is triggered, which retrieves the source code from the repository, makes RAS related changes based upon the policy chosen by the developer, formats the code as indicated in the wizard and displays the results in the IDE ready for development.

The source program 50 is checked in with the code including the automatically generated RAS code. The checked in source program 50 is then compiled and run in block 60. If the programmer 20 wishes to make changes, the programmer 20 checks out the checked in source program 50 through a remover 90, which optionally removes selected RAS code. Otherwise, the RAS code that may remain in the checked out program 30. In another option, RAS code may be automatically removed, e.g., during check out.

The programmer 20 may wish to see the checked out source program 30 with the RAS code to understand what it does or, in the process of debugging the program, to step through the execution of the program exactly as compiled. Also, in some cases the automatically generated code may need extra statements. For example, in an automatically-generated try-catch block, the programmer 20 may wish to add code for the catch condition to handle errors in a certain way. Try-catch blocks are known in the art. The programmer 20 is given the option of seeing the generated try-catch, adding an error handling code for the catch condition and having these changes noted and preserved by the code analyzer 40 on check-in. The code analyzer 40 may be configured in a way to optionally permit changes to the RAS code such as in the try-catch example.

Optionally, the automatically generated code may be removed automatically by the remover 90. The remover 90 may be configured to determine when RAS codes may be redundant or unnecessary in the program code. The automatic removal may be based on the RAS policy 80, be based on experience or common practices in programming.

In one embodiment, RAS check in/check out is enabled by special character sequences. When the checked out source program 30 is checked in (in block 50), the code analyzer 40 inspects the source program 30 to insert RAS code only as necessary where there is no existing RAS code. This may be made possible by a special character sequence added to the RAS code as it is generated. The special character may be used as a marker to indicate that this is automatically generated code.

Generation of the special character sequences that flag automatically generated RAS code can be performed as part of a check-in process (in block 50) of an IDE or run manually against another source code file for the desired result. The developer then can focus on the algorithm and the source code in development without being bothered by the RAS function which will be needed in a production environment later for problem determination and debugging purposes.

The remover 90 may remove the RAS code at or before checkout in block 30. The remover 90 looks in the checked in source program 50 for a special character sequence that flags automatically generated RAS code to recognize and optionally remove the code to generate the checked out source program 30.

Alternatively, the remover 90 may simply return to the programmer 20 (through block 30), a stored version of the code before the RAS code was added, should the programmer not wish to see the RAS generated code.

Optionally, the RAS code may not be removed upon check-out (block 30). The programmer 20 who requests a check out of RAS enabled code may request the generated RAS code and then add to the code or modify the code. There is also the option of expanding the character sequence to a full generated code visible to the programmer 20 who then can make custom modifications, which persist. Some customization of a compiler user interface may be needed to implement this. An example of how to do this may include using open standards such as those used by the Eclipse™ development environment.

After the programmer 20 modifies the generated RAS code in the checked out program 30, the programmer 20 may add to or modify the automatically-generated character sequence that flags this RAS code to specify that the code has been modified. This flags the code to be left alone by the RAS system, and also optionally causes a report to be made to the administrator/management 70 that the programmer 20 has overridden the automatic RAS system. The administrator/management may then inspect these changed codes and modify a character sequence that flags this RAS code to specify that these changes are approved.

A summary of the three different special character sequences used to mark RAS code will now be illustratively described. Markers may be used in pairs, as, e.g., XML, to indicate the beginning and end of marked code. A character sequence number may be designated as, e.g.:

1. Used to mark automatically generated RAS code session for identification and removal purposes.

2. Modified from marker 1, to indicate that RAS code should not be automatically removed or modified during check-in/check-out, bypassing by RAS system.

3. Modified from marker 2 with the same function as marker 2 but indicating management/technical approval of the code. Of course any special symbol, maker or sequence may be used.

The present principles will now be further described in terms of specific examples. Although the present description focuses on RAS code, other types of codes may also be employed. The term RAS (Reliability, Accessibility, and Serviceability) has been adopted in a number of disciplines, each with their own localized interpretation. For example, in the computer hardware community Accessibility indicates the ease with which one may access a computer through software to reconfigure what the software does or to pull a computer from a rack for servicing. Even this definition of RAS may be related to the term RAS (Reliability, Availability and Serviceability), which was coined to characterize computer hardware performance. Within the software development community RAS (Reliability, Accessibility, and Serviceability) has its own interpretation as will be described.

Reliability: Reliability has to do with avoiding and detecting errors. A reliable system delivers correct results or issues an alert of possible trouble. For example, if an arithmetic error occurs, then an exception must be thrown and handled, and if a database update fails, then it must be rolled back. Developers often omit appropriately handling these problems in programming code, because of inattention or because, for example, the developers may not be aware of every possible exception that might be thrown by every statement. Automatically generated code assures a minimum degree of error handling.

In one example, Try-Catch conditions will be described in a way to illustratively describe automatically generated code for reliability. In one embodiment, the autonomic RAS generating system automatically creates and handles try-catch conditions. For example, if an arithmetic error occurs, then an exception is thrown and handled. Try-catch blocks are implemented by performing native application programming interface (API) look-ups to determine what exceptions are thrown within a given code block. Try-catch blocks are problematical to implement in an automated way using existing tools, such as macros, because they are potentially far flung with bits and pieces of the try-catch block scattered over many lines of code. In accordance with one embodiment, system 10 understands, or knows where to find out, which methods throw which exceptions within an exception framework of a given programming language, so that the system 10 may generate an appropriate try-catch condition.

Listing 1, set forth below, shows a common statement where a new primitive integer is being created from a string. A compiler would not issue any warnings, by default, for alerting the programmer to the possibility of a NumberFormatException (nfe). In this case, the RAS enabled code would look the same as the original code, however the try/catch block may be inserted out of site of the programmer to make the RAS code more robust.

Listing 1—Try-Catch:
Original Code (Java™):
    int i=new Integer("xyz").intValue( );
RAS enabled code (Java™):

```
    try
    {
        int i = new Integer("xyz").intValue( );
    }
    catch(NumberFormatException nfe)
```

-continued

```
    {
        //print message
    }
```

Development-time compile errors may be an issue. For example, the IBM® Rational Application Developer™ product (RAD) compiles in real time, which would cause the Original Code of Listing 1 above to throw errors, because it would demand a try-catch block in the code. There are at least three solutions to this problem.

1. The compiler or code analyzer 40 sees the Original Code as it is being written and suppresses these errors. 2. The compiler or code analyzer 40 sees the Original Code as it is being written, and the errors are intercepted by the present system and suppressed. 3. The compiler or code analyzer 40 sees RAS-enabled code that is dynamically generated as the Original Code as the code is being written, and then there will be no try-catch errors to suppress.

Database Rollback: Another embodiment automatically creates code to roll back database updates if the updates fail. Database rollbacks are quite similar to try-catch blocks. Rollbacks differ in that more information is usually needed to determine the correct approach after a database error. For example, a choice is made to perform a rollback or to just continue and report errors at the end of the process. This is determined by the Administrator's entries in the RAS policy table 80. In the example code of Listing 2, when an error is encountered a database rollback is issued.

Listing 2—Database Rollback:
Original Code (Java™):

```
    Statement stmt =
        con.createStatement(ResultSet.TYPE_SCROLL_SENSITIVE,
            ResultSet.CONCUR_READ_ONLY);
```

RAS enabled code (Java™):

```
    try
    {
        Statement stmt =
            con.createStatement(ResultSet.TYPE_SCROLL_SENSITIVE,
                ResultSet.CONCUR_READ_ONLY);
    }
    catch(SQLException se)
    {
        //print message
        con.rollback( );
    }
```

Accessibility: Accessibility has to do with presentation to an end user. As an example, accessibility for handicapped means that steps are taken to permit access to a location. In programming, accessibility may include such things as security measures, providing multi-language support, etc.

In one embodiment, the autonomic RAS generator automatically generates National Language Support (NLS) code. Simple writes to output are common in informal programming. Developers often cannot avoid a simple non-NLS-enabled write to output. Automatically generated code permits programmers to continue their comfortable, simple, informal practices and have these practices intercepted automatically to generate proper professional code when the informal practice leads to issues in the program code.

National Language Support (NLS) code permits one program to function in any one of several languages. A language is selected before the program is run. When the program runs, the program refers to a table of dialog entries, where one utterance or statement is represented in several languages. The program selects that utterance in the appropriate language. In more technical terms, NLS provides repetitive insertion of Property Bundles, which read the NLS converted properties file, into the source.

Copyright warnings or copyright information are subject to change and sometimes changes multiple times as a company's intellectual property team rewords various portions of the copyright statement. Both NLS and copyright issues may be resolved by automatic RAS code generation. In this way, common entries throughout numerous program statements can be updated automatically in the proper language and with the proper or agreed to terminology throughout a document or program. RAS code so generated may include output channel setup for RAS output at the beginning of the code.

It is often the case in software development that new requirements are added throughout the various development cycles. Constantly revising requirements makes it difficult to ensure the code developed has National Language Support (NLS). For this reason, Listing 3 shows how the original code could be modified to support multiple locales. Not shown in Listing 3, the text "Hello.", is also automatically placed in the Properties file.

Listing 3—NLS
Original code (Java™)
System.out.println("Hello.");
RAS enabled code (Java™)

```
Locale currentLocale = new Locale(language, country);
ResourceBundle messages =
    ResourceBundle.getBundle("MessagesBundle",current
    Locale);
System.out.println(messages.getString("greetings") );
```

Serviceability: Serviceability involves servicing the program, for example, evaluating log files to see what the program has done, and the level and detail of trace statements that are dumped to these log files. From this, changes in the program can be understood and the effects of the changes can be evaluated by further use of logs and traces.

Developers often accidentally omit trace code or get out of sync with other developers on which trace levels are available and what they mean. The task of manually inserting trace statements is often peripheral to the job of coding, and an error of omission or level numbering is often difficult to detect as it does not cause a logic error in the program. In addition, the conditions to trace and their levels may change as the program undergoes development. Therefore, automatically generated code assures completeness and consistency in all cases.

Trace and logging: Another embodiment automatically generates trace and logging code. Automatic generation gives uniformity output format and style and uniform level of detail control. Enabling automatic generation of trace and logging statements and the definition of how a trace level functions are matters for the Administrator 70 who sets the RAS Policy 80. Once complied the program logs its normal operation at a default trace level, or the trace level may be changed by an engineer or other party, ordinarily from a configuration file, possibly to, e.g., track down a program defect.

Trace and logging code is inserted, for example, following program structure (e.g., subroutine entry), every few (e.g., three) instructions of the sequential code, to trace loop execution, and for resource release at the end of a block, subroutine, or program. The output channel may include local files, a remote server through a communication network, named pipes, etc. The output information ranges from a copy of the program instruction to a snapshot of all program variables' values, constant definitions, etc. Listing 4 shows a difference between an original code for trace level assignment and automatically generated code for trace level assignment in accordance with present principles.

Listing 4—Trace
Original Code (C++):

```
Void procedue1(para1, para2)
{
    i= (para1 / 400 ) + para2 * 2;
    ..................
}
```

RAS enabled code (C++):

```
Void procedue1(para1, para2)
{
    if (tracelevel > 10)
        { print("enter procedure1 para1= %d, para2= %d", para1, para2);
            if (tracelevel > 80)
                // stack dump
    i= (para1 / 400 ) + para2 * 2;
    ..................
}
```

Figure 2:
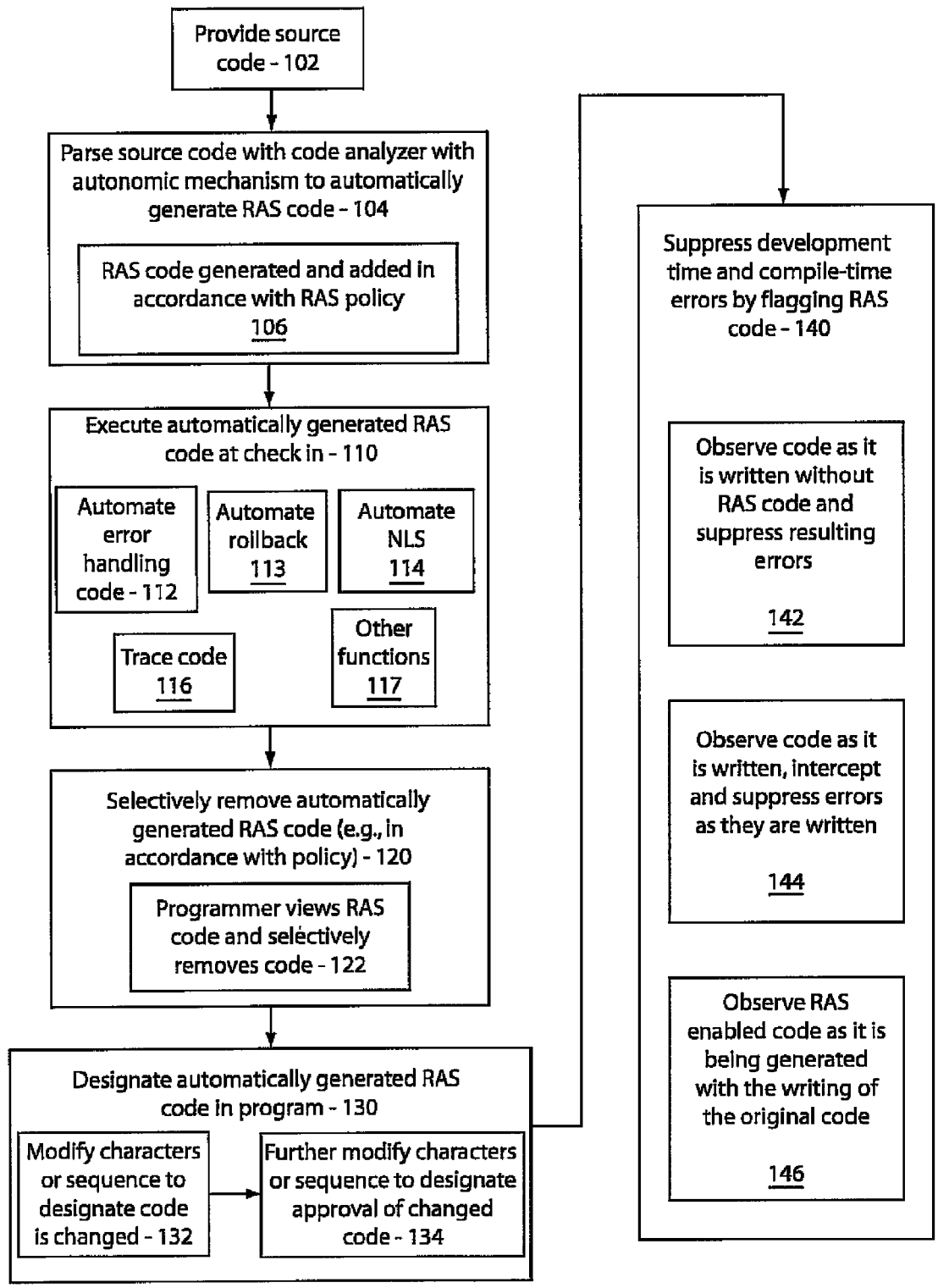
FIG. 2 is a block/flow diagram showing a program and method for automatically generating RAS program code in accordance with the present principles.

Referring to FIG. 2, a block/flow diagram shows an illustrative system/method for automatic code generation in accordance with an exemplary embodiment. In block 102, source code is provided by a programmer and input to a code analyzer. In block 104, the code analyzer parses the source code in a source program to automatically generate reliability, accessibility and serviceability (RAS) code in response to the source code. The code analyzer includes an autonomic mechanism provided to automate RAS code generation and removal. The RAS code is executed automatically, within the software IDE, when a developer checks in the code file and similarly removed automatically during "check out" to keep the main algorithm clean and focused. The code analyzer first parses the program like a compiler, and RAS codes are generated automatically and inserted into original algorithm.

The automatically generated RAS code is triggered and added in accordance with the RAS policy in block 106. The RAS code and policy may specify, e.g., covered statement types (Reliability), supported languages (Accessibility) and how frequent and detailed program internal reports should be (Serviceability). The RAS code insertion is performed according to the defined RAS policy set by an administrator or the like.

In block 110, the automatically generated code is executed in a check in stage. The automatically generated RAS code may provide automating at least one of: error handling code generation and/or code removal in block 112; database rollback on errors in block 113; National Language Support (NLS) code conversion, generation and/or removal for universal accessible software system in block 114; trace code generation and/or removal for high quality software system serviceability in block 116; and any other application in block 117.

In block 120, the automatically generated RAS code is selectively removed. For example, all, a portion or none of the automatically generated code may be removed during a check out stage to keep the source program clean and focused. The RSA code that is removed may be based on RSA policy.

Selectively removing may include permitting a user to control visibility of the automatically generated code and the automatically generated code's removal in block 122. The system permits the user to control the visibility of the system generated code and its automatic removal. The automatically generated RAS code may be optionally removed at program checkout. Optionally, a remover may simply return to the programmer, a stored version of the code before the automatically generated RAS code was added, should the programmer not wish to see the RAS generated code.

In block 130, a character or sequence of characters may be added to designate the automatically generated RAS code within the source program. The special character or sequence is preferably used as a marker to indicate automatically generated RAS code, either as part of the check-in process of an IDE, or by running through the program manually against a source code file to indicate differences or changes.

In block 132, the character or sequence of characters may be modified during the check out stage to indicate that changes have been made, e.g., by the programmer. In block 134, the character or character sequence may be further modified to flag that changes to the automatically generated RAS code have been authorized, e.g., by an administrator or supervisor.

To illustrate, when a programmer checks out code in which the RAS code has not been removed and changes have been made to the RAS code, those changes are stored upon check in. After the programmer modifies the generated RAS code in the checked out program, the programmer may add to or modify the automatically-generated character sequence that mark this RAS code to specify that the RAS code has been modified. This flags the code to be left alone by the RAS system. When the programmer modifies the marker to indicate that the programmer has made changes to the code, this optionally causes a report to be made to the Administrator/Management that the programmer has overridden the automatic RAS system. The Administrator/Management may then inspect these changed codes and modify the flagged code further. The marker is modified to indicate that these changes are approved and that the RAS system should leave them alone.

In block 140, development-time and compile-time errors may be suppressed by flagging RAS code written by a programmer. The suppression of errors and reduced development times may be as a result of applying at least one of following flagging methods. In block 142, a compiler (or code analyzer) observes original code as the original code is being written by the programmer without explicit RAS code and suppresses errors generated as a result of the lack of RAS code being provided by the programmer. In block 144, a compiler or code analyzer observes original code as the original code is being written by the programmer. The compiler or code analyzer intercepts and suppresses errors as the errors are written by the programmer. In block 146, a compiler or code analyzer observes RAS-enabled code that is dynamically generated with original code as the original code is being written by the programmer. Then, there will be no RAS errors to suppress, since the RAS code is already present.

Having described preferred embodiments of a system and method for quality assurance in software systems through autonomic reliability, availability and serviceability code generation (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A system for automatic code generation, comprising:
a code analyzer including a processor configured to parse source code, the code analyzer including an automatic mechanism configured to respond to code in the source program to automatically generate and remove reliability, accessibility and serviceability (RAS) source code;
a check in stage configured to insert the automatically generated RAS source code into the source code when a developer has to check in the source code; and
a check out stage configured to selectively remove all, a portion or none of the automatically generated source code during check out to keep the source program clean and focused.

2. The system as recited in claim 1, wherein the code analyzer parses the source program as a compiler wherein the RAS source code is generated automatically and inserted into original source code of the source program.

3. The system as recited in claim 1, further comprising a RAS policy configured to determine aspects of RAS source code insertion.

4. The system as recited in claim 3, wherein the RAS specifies at least one of covered statement types (Reliability), supported languages (Accessibility) and how frequent and detailed program internal dumps should be (Serviceability).

5. The system as recited in claim 1, further comprising a remover configured to permit a user to control visibility of the automatically generated source code and the automatically generated source code's removal.

6. The system as recited in claim 5, wherein the remover returns a stored version of the source code before the automatically generated RAS source code was added.

7. The system as recited in claim 1, further comprising a character or sequence of characters configured to designate the automatically generated RAS source code.

8. The system as recited in claim 7, wherein the character or sequence of characters are modified during the check out stage to indicate that changes have been made or changes have been approved to the automatically generated RAS source code.

9. The system as recited in claim 1, wherein the system is integrated in one of Integrated Development Environment (IDE), version control system and an independent utility.

10. A method for automatic code generation, comprising:
parsing source code in a source program to automatically generate reliability, accessibility and serviceability (RAS) source code in response to the source code;
inserting the automatically generated RAS source code into the source code in a check in stage; and
selectively removing all, a portion or none of the automatically generated source code during a check out stage to keep the source program clean and focused.

11. The method as recited in claim 10, wherein parsing includes parsing the source code to add the automatically generated RAS source code in accordance with a RAS policy.

12. The method as recited in claim 11, wherein the RAS specifies at least one of covered statement types (Reliability), supported languages (Accessibility) and how frequent and detailed program internal reports should be (Serviceability).

13. The method as recited in claim 10, wherein selectively removing includes permitting a user to control visibility of the automatically generated source code and the automatically generated source code's removal.

14. The method as recited in claim 10, further comprising inserting a character or sequence of characters to designate the automatically generated RAS source code.

15. The method as recited in claim 14, further comprising: modifying the character or sequence of characters during the check out stage to indicate that changes have been made.

16. The method as recited in claim 15, further comprising: further modifying the character or character sequence for the automatically generated RAS source code to flag changes to the automatically generated RAS source code that have been authorized.

17. The method as recited in claim 10, further comprising automating at least one of:
   error handling source code generation and/or source code removal; database rollback on errors; National Language Support (NLS) code conversion, generation and/or removal for universal accessible software system; and trace code generation and/or removal for high quality software system serviceability.

18. The method as recited in claim 10, further comprising:
suppressing development-time and compile-time errors by flagging RAS source code written by a programmer by at least one of:
   observing, by a compiler, original source code as the original source code is being written by the programmer without explicit RAS source code and suppressing errors generated as a result;
   observing, by a compiler, original source code as the original source code is being written by the programmer, and intercepting and suppressing errors as the errors are written; and
   observing, by a compiler, RAS-enabled source code that is dynamically generated with original source code as the original source code is being written by the programmer.

19. A computer program product for automatic code generation comprising a non-transitory computer useable storage medium including a computer readable program, wherein the computer readable program when executed on a computer causes the computer to perform the steps of:
   parsing source code in a source program to automatically generate reliability, accessibility and serviceability (RAS) source code in response to the source code;
   inserting the automatically generated RAS source code into the source code in a check in stage; and
   selectively removing all, a portion or none of the automatically generated source code during a check out stage to keep the source program clean and focused.

20. The computer program product as recited in claim 19, further comprising:
   inserting a character or sequence of characters to designate the automatically generated RAS source code;
   modifying the character or sequence of characters during the check out stage to indicate whether changes have been made; and
   further modifying the character or character sequence for the automatically generated RAS source code to flag that changes to the automatically generated RAS source code have been authorized, if applicable.

* * * * *